(12) United States Patent
Tani

(10) Patent No.: US 9,181,908 B2
(45) Date of Patent: Nov. 10, 2015

(54) SADDLE RIDE TYPE VEHICLE

(71) Applicant: HONDA MOTOR CO., LTD., Tokyo (JP)

(72) Inventor: Yusaburo Tani, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/480,801

(22) Filed: Sep. 9, 2014

(65) Prior Publication Data

US 2015/0090513 A1 Apr. 2, 2015

(30) Foreign Application Priority Data

Sep. 30, 2013 (JP) ................................. 2013-205439

(51) Int. Cl.
| | |
|---|---|
| *F02M 35/00* | (2006.01) |
| *F02M 35/16* | (2006.01) |
| *F02M 35/10* | (2006.01) |
| *B62K 11/04* | (2006.01) |
| *B62K 25/04* | (2006.01) |

(52) U.S. Cl.
CPC .............. *F02M 35/162* (2013.01); *B62K 11/04* (2013.01); *B62K 25/04* (2013.01); *F02M 35/10091* (2013.01); *F02M 35/10216* (2013.01)

(58) Field of Classification Search
CPC ... F02M 35/162; F02M 35/10216; F02B 1/04
USPC .......................................................... 180/219
See application file for complete search history.

(56) References Cited

U.S. PATENT DOCUMENTS

| | | | | |
|---|---|---|---|---|
| 6,843,219 | B2 * | 1/2005 | Matsuda et al. | 123/184.21 |
| 7,571,714 | B2 * | 8/2009 | Miyashiro | 123/470 |
| 7,637,242 | B2 * | 12/2009 | Koide et al. | 123/198 E |
| 7,681,678 | B2 * | 3/2010 | Shiraishi | 180/68.3 |
| 7,806,212 | B2 * | 10/2010 | Sudoh et al. | 180/68.3 |
| 8,869,926 | B2 * | 10/2014 | Higashiyama | 180/219 |
| 2008/0223642 | A1 | 9/2008 | Shiraishi | |
| 2011/0174273 | A1 | 7/2011 | Otsuka et al. | |
| 2014/0318499 | A1 * | 10/2014 | Tanaka | 123/478 |

FOREIGN PATENT DOCUMENTS

| | | |
|---|---|---|
| JP | 2008-222078 A | 9/2008 |
| JP | 2011-137428 A | 9/2008 |

* cited by examiner

*Primary Examiner* — Kevin Hurley
*Assistant Examiner* — Michael Stabley
(74) *Attorney, Agent, or Firm* — Birch, Stewart, Kolasch & Birch, LLP

(57) ABSTRACT

An intake system includes an air cleaner arranged behind the cross member with a shock absorber supporting portion supporting an upper end of a rear shock absorber unit connected to an engine main body in such a manner wherein a straddling portion is curved in a shape convex upwardly to straddle the cross member and also the shock absorber supporting portion from above. A fuel injection valve for the intake system is arranged in front of the cross member. An intake passage is formed to extend linearly downwardly and to the front toward an intake port at a downstream side of a straddling portion. An upper portion of a passage forming member forming at least a part of the straddling portion by forming an apex part of the straddling portion is provided with a second fuel injection valve attached with its fuel injection direction directed to the intake port.

10 Claims, 3 Drawing Sheets

SADDLE RIDE TYPE VEHICLE

CROSS-REFERENCE TO RELATED APPLICATIONS

The present application claims priority under 35 USC 119 to Japanese Patent Application No. 2013-205439 filed Sep. 30, 2013 the entire contents of which are hereby incorporated by reference.

BACKGROUND OF THE INVENTION

1. Field of the Invention

The present invention relates to a saddle ride type vehicle in which a vehicle body frame includes a head pipe supporting a steering handlebar in a steerable manner, a pair of left and right main frames extending downwardly and rearwardly from the head pipe, a pair of left and right pivot frames extending downwardly from rear ends of the main frames, a pair of left and right seat rails provided to extend rearwardly continuously from the rear ends of the main frames or upper ends of the pivot frames and a cross member including a shock absorber supporting portion supporting an upper end of a rear shock absorber unit. The cross member connects together the rear ends of the pair of left and right main frames or the upper ends of the pair of left and right pivot frames. An engine main body of an internal combustion engine is mounted on the vehicle body frame below the main frames in a side view. An intake system includes an air cleaner arranged behind the cross member and a throttle body inserted between the air cleaner. The intake port of the engine main body is connected to the engine main body in such a manner so as to have a straddling portion curved in a shape convex upward to straddle the cross member and also the shock absorbing supporting portion together from above. A fuel injection valve arranged in front of the cross member, is provided to the intake system.

2. Description of Background Art

Japanese Patent Application Publication No. 2008-222078 discloses an intake system for motorcycle in which an intake pipe connecting a throttle body and an air cleaner is formed to curve in such a manner so as to straddle, from above, a cross member connecting upper ends of a pair of left and right pivot frames. A fuel injection valve is provided to the intake pipe connecting the throttle body and a cylinder head.

Japanese Patent Application Publication No. 2011-137428 discloses a structure in which a first fuel injection valve is attached to a throttle body and a second fuel injection valve is provided to an intake system on an upstream side of the throttle body in order to improve the output of an internal combustion engine.

In order to improve the output of the internal combustion engine, the aforementioned saddle ride type vehicle disclosed in Japanese Patent Application Publication No. 2008-222078 may be modified with a second fuel injection valve attached to the intake system behind the cross member as described in Japanese Patent Application Publication No. 2011-137428, in addition to the fuel injection valve provided to the intake system in front of the cross member. However, since a part of the intake system is configured to straddle the cross member from above, the above modification has a problem that it is difficult to arrange the second fuel injection valve behind the cross member while improving an air intake efficiency.

SUMMARY AND OBJECTS OF THE INVENTION

The present invention was made in view of the above circumstances, and has an object of an embodiment to provide a saddle ride type motorcycle in which a second fuel injection valve is easily arranged behind a cross member to improve air intake efficiency.

For the purpose of solving the above-mentioned problems, a first feature of an embodiment of the present invention provides a saddle ride type vehicle in which a vehicle body frame includes a head pipe supporting a steering handlebar in a steerable manner, a pair of left and right main frames extending downwardly and rearwardly from the head pipe with a pair of left and right pivot frames extending downwardly from rear ends of the main frames. A pair of left and right seat rails are provided to extend rearwardly continuously from the rear ends of the main frames or upper ends of the pivot frames. A cross member includes a shock absorber supporting portion supporting an upper end of a rear shock absorber unit. The cross member connects the rear ends of the pair of left and right main frames or the upper ends of the pair of left and right pivot frames together. An engine main body of an internal combustion engine is mounted on the vehicle body frame below the main frames in a side view. An intake system includes an air cleaner arranged behind the cross member and a throttle body inserted between the air cleaner and the intake port of the engine main body is connected to the engine main body in such a manner as to have a straddling portion curved in a shape convex upwardly to straddle the cross member and also the shock absorber supporting portion together from above. A fuel injection valve, arranged in front of the cross member, is provided to the intake system wherein an intake passage included in the intake system is formed to extend linearly downwardly and to the front toward the intake port at a downstream side of the straddling portion. An upper portion of a passage forming member forming at least a part of the straddling portion by forming an apex part of the straddling portion is provided with a second fuel injection valve attached with its fuel injection direction directed to the intake port.

According to an embodiment of the present invention, the second fuel injection valve is attached to the upper portion of the passage forming member behind the apex part of the straddling portion.

According to an embodiment of the present invention, the passage forming member is a clean side case constituting a part of the air cleaner, the straddling portion includes an upper portion of the clean side case and a connecting tube extending upwardly and rearwardly from the throttle body with an upstream end of the connecting tube connected to the upper portion of the clean side case, and the second fuel injection valve is attached to the clean side case.

According to an embodiment of the present invention, the clean side case is formed to include an expanded portion at the upper portion thereof, the expanded portion expanded upwardly above the shock absorber supporting portion with the upstream end of the connecting tube connected to the expanded portion, and the second fuel injection valve is attached to the expanded portion on an opposite side from a side to which the upstream end of the connecting tube is connected.

According to an embodiment of the present invention, a second cross member is provided between front portions of the pair of left and right seat rails, and the second fuel injection valve is attached to the expanded portion arranged below the second cross member in the side view, and arranged between the front portions of the pair of left and right seat rails in a plan view. The second fuel injection valve is attached in a manner covered with the pair of left and right seat rails from lateral sides and covered with the second cross member from above.

According to an embodiment of the present invention, the air cleaner includes the clean side case and a cleaner element attached to the clean side case in a manner covering an opening portion provided to the clean side case. The cleaner element is covered from above with a passenger seat placed on the pair of left and right seat rails. The cleaner element is covered from lateral sides with a pair of left and right side covers supported by the seat rails, the cleaner element is covered from below and behind with a rear fender attached to rear portions of the seat rails, and the second fuel injection valve is attached to the clean side case above the cleaner element.

It should be noted that an upper cross member 13 in an embodiment is equivalent to the cross member of the present invention, and a seat supporting cross member 67 in the embodiment is equivalent to the second cross member of the present invention.

According to an embodiment of the present invention, the intake passage linearly extends downwardly and to the front toward the intake portion at the downstream side of the straddling portion that straddles the cross member from above. The second fuel injection valve is attached to the passage forming member, forming at least the part of the straddling portion, with its fuel injection direction directed to the intake port. Thus, fuel-mixed air in fuel injection from the second fuel injection valve is fed to the intake port linearly downwardly from above. This structure enhances an intake efficiency by reducing an intake pressure loss and makes it easy to arrange the second fuel injection valve behind the cross member. In addition, this structure is also capable of promoting atomization of the fuel with a distance secured between the second fuel injection valve and the intake port.

According to an embodiment of the present invention, the second fuel injection valve is attached to the upper portion of the passage forming member behind the apex part of the straddling portion. Thus, the second fuel injection valve can be easily arranged with its fuel injection direction directed to the intake port, without using a special bracket or the like, but by using the shape of the straddling portion curved to be convex upwardly.

According to an embodiment of the present invention, the straddling portion includes the upper portion of the clean side case of the air cleaner, and the connecting tube extending upwardly and rearwardly from the throttle body. Thus, the intake passage has a large capacity of the clean side case at the upstream side of the curved part of the straddling portion, which can reduce the intake pressure loss due to the curved structure. Moreover, since the second fuel injection valve is attached to the clean side case, only an attachment portion for attaching the second fuel injection valve needs to be formed in the clean side case. In this way, the second fuel injection valve can be attached with a simple process and structure.

According to an embodiment of the present invention, the expanded portion included in the upper portion of the clean side case is expanded upwardly above the shock absorber supporting portion. The second fuel injection valve is attached to the expanded portion on the opposite side from the side to which the upstream end of the connecting tube is connected. This structure can enhance the degrees of freedom in positions where the connecting tube and the fuel injection valve are to be attached to the clean side case.

According to an embodiment of the present invention, the second cross member provided between the front portions of the pair of left and right seat rails exists above the second fuel injection valve, and the pair of left and right seat rails exist on the lateral sides of the second fuel injection valve. Thus, the second fuel injection valve can be protected by the second cross member and the seat rails.

According to an embodiment of the present invention, the second fuel injection valve is accessible from above only by detaching the passenger seat. Thus, it is easy to perform maintenance work of the second fuel injection valve.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinafter, an embodiment of the present invention is described with reference to FIGS. 1 to 3. Note that, in the following description, front-rear, left-right and upper-lower indicate directions or sides viewed from a passenger operating a saddle ride type vehicle.

Figure 1:
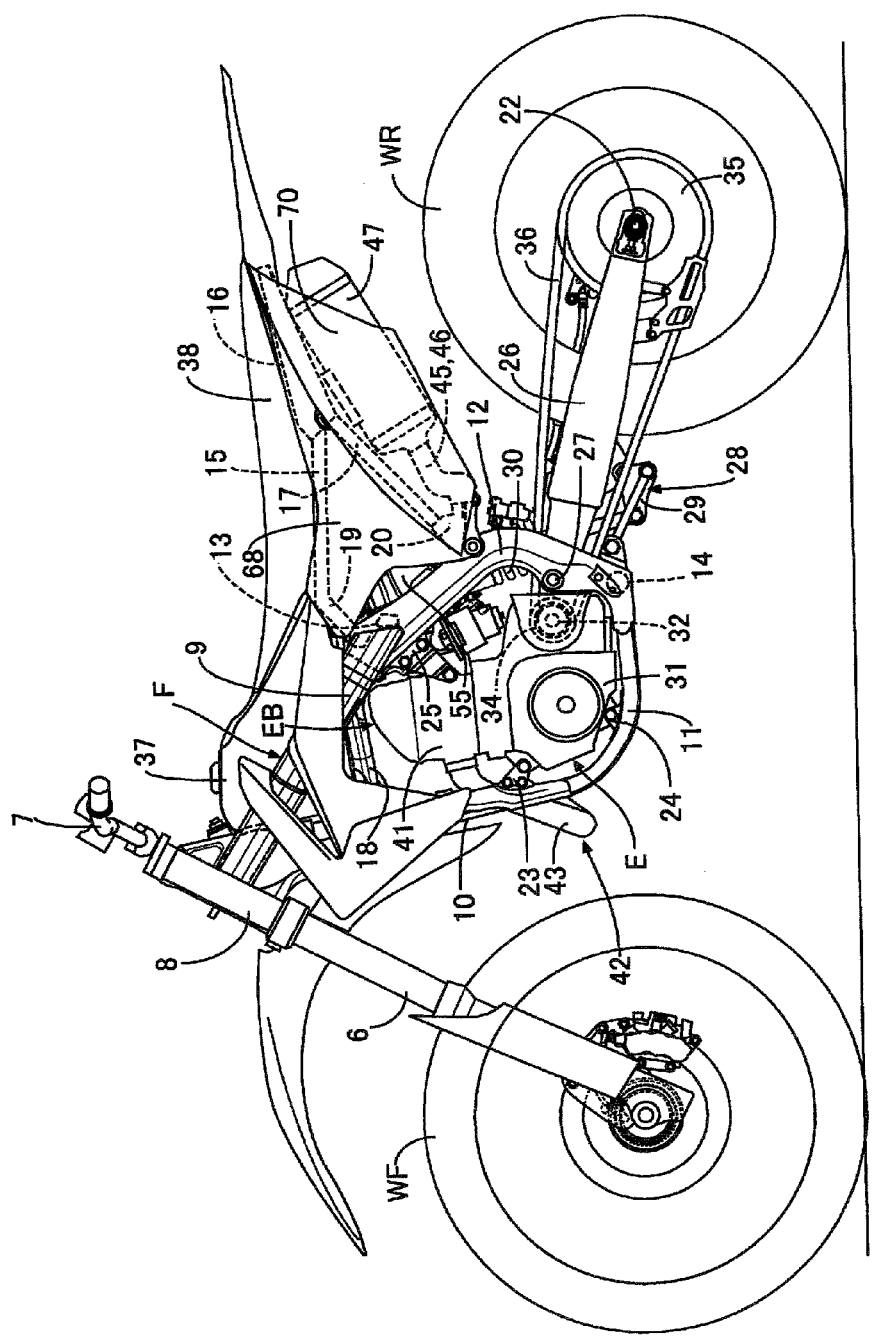
FIG. 1 is a side view of a main part of a motorcycle.

As illustrated in FIG. 1, the saddle ride type vehicle is a motorcycle for motocross racing. A vehicle body frame F thereof includes a front fork 6 supporting a front wheel WF in a rotatable manner, a head pipe 8 supporting a bar-shaped steering handlebar 7 in a steerable manner, a pair of left and right main frames 9 extending downwardly and rearwardly from the head pipe 8, a down frame 10 extending downwardly and rearwardly from the head pipe 8 at a steeper angle than the main frames 9 extends, a pair of left and right lower frames 11 provided to extend rearwardly continuously from a lower end of the down frame 10, a pair of left and right pivot frames 12 extending downwardly with upper ends thereof joined to rear ends of the pair of left and right main frames 9 and with lower ends thereof extending to rear ends of both the lower frames 11. An upper cross member 13 connects rear ends of the pair of left and right main frames 9 or upper ends of the pair of left and right pivot frames 12 (the upper ends of the pivot frames 12 in this embodiment) together with a lower cross member 14 provided between lower ends of both the pivot frames 12. A pair of left and right seat rails 15 is provided to extend rearwardly continuously from the rear ends of the main frames 9 or the upper ends of the pivot frames 12 (the rear ends of the main frames 9 in this embodiment). A rear cross member 16 connects rear ends of both the seat rails 15 together with a pair of left and right rear frames 17 extending upwardly and rearwardly with front ends thereof connected to vertically-middle portions of both the pivot frames 12 and with rear ends thereof connected to the rear cross member 16. A substantially U-shaped reinforcement frame 18 connects a lower portion of the down frame 10 to both the main frames 9.

Figure 2:
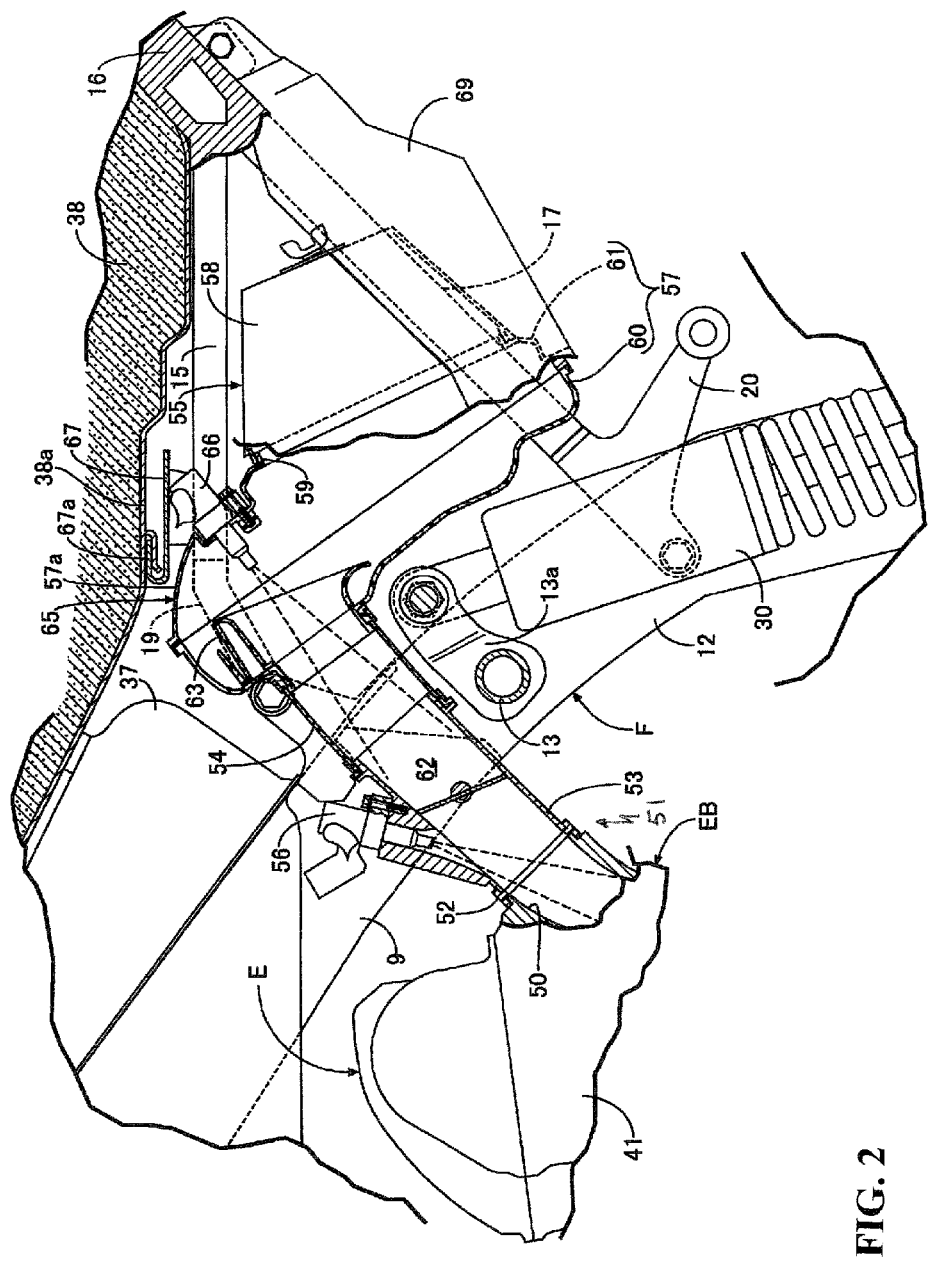
FIG. 2 is a side view of a vertical cross section of the main part in FIG. 1.

With reference to FIG. 2, upper support members 19 are fastened to upper portions of the rear ends of the main frames 9, respectively, and front ends of the seat rails 15 are connected to the upper support members 19. In addition, lower support members 20 are fastened to the vertically-middle portions of the pivot frames 12, and the front ends of the rear frames 17 are connected to the lower support members 20.

On the vehicle body frame F, an engine main body EB of an internal combustion engine E is mounted below the main frames 9 in a side view. A front portion of the engine main body EB is supported by the down frame 10 via a first hanger 23, lower portions of the engine main body EB are supported by second hangers 24 provided on the lower frames 11, and upper portions of the engine main body EB are supported by upper portions of the pivot frames 12 via third hangers 25.

An axle 22 of a rear wheel WF is rotatably supported by rear ends of a swing arm 26 extending in a front-rear direction while sandwiching the rear wheel WR from both sides, and a front end of the swing arm 26 is supported by lower portions of the pivot frames 12 of the vehicle body frame F via a spindle 27 such that the swing arm 26 can swing up and down.

A link mechanism 28 is provided between the lower cross member 14 of the vehicle body frame F and the swing arm 26. A rear shock absorber unit 30 is provided between a link member 29 constituting a part of the link mechanism 28, and a shock absorber supporting portion 13a integrally included in the upper cross member 13 at a center part in a vehicle width direction. The rear shock absorber unit 30 extends in the vertical direction between the pair of left and right pivot frames 12 arranged behind the engine main body EB. In other words, the rear shock absorber unit 30 is arrange behind the engine main body EB with an upper end of the rear shock absorber unit 30 supported on the shock absorber supporting portion 13a of the upper cross member 13. A lower end of the rear shock absorber unit 30 is connected to the swing arm 26 via the link member 29 of the link mechanism 28.

A transmission not illustrated is housed inside a crankcase 31 constituting a part of the engine main body EB and an output shaft 32 of the transmission protrudes from the crankcase 31 to the left. An endless chain 36 is wound around a driving sprocket 34 mounted on the output shaft 32 and a driven sprocket 35 mounted on the axle 22 of the rear wheel WR.

A fuel tank 37 is provided on both the main frames 9 above the engine main body EB, and a passenger seat 38 is provided behind the fuel tank 37 in a manner supported by the seat rails 15.

Figure 3:
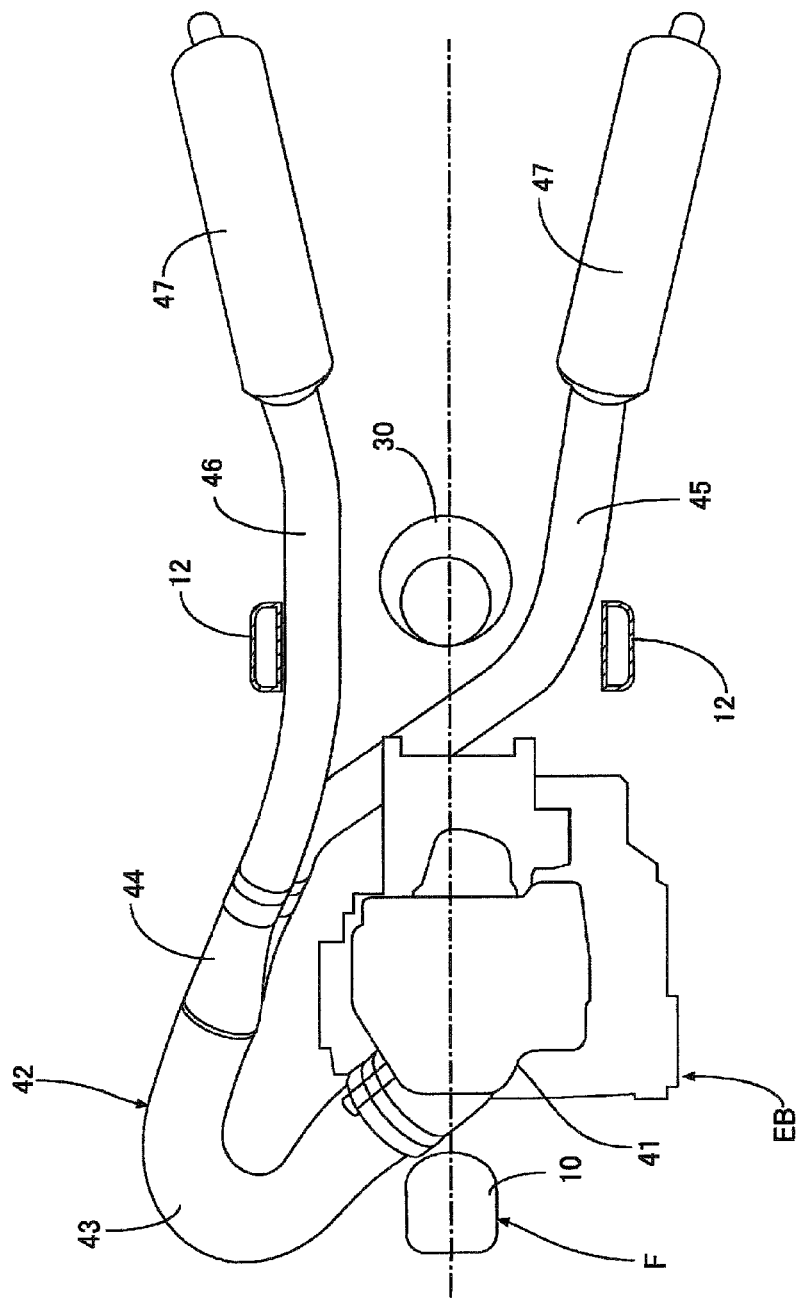
FIG. 3 is a plan view of a horizontal cross section illustrating a schematic layout of an exhaust system in comparison with a vehicle body frame and a rear shock absorber unit.

With reference to FIG. 3, an exhaust system 42 connected to a cylinder head 41 constituting a part of the engine main body EB includes a collective exhaust pipe 43, a pair of branched exhaust pipes 45, 46 and mufflers 47, 47. The collective exhaust pipe 43 is connected at its upstream end to a front wall of the cylinder head 41 and turns around to the right side of the engine main body EB. The branched exhaust pipes 45, 46 are connected to a downstream end of the collective exhaust pipe 43 via a branch connection pipe 44 and the mufflers 47, 47 are individually connected to downstream ends of the branched exhaust pipes 45, 46.

The branched exhaust pipes 45, 46 are arranged to extend rearwardly behind the engine main body EB while individually passing through spaces between the rear shock absorber unit 30 and the pair of left and right pivot frames 12, 12, and are connected to the mufflers 47, 47 above the left and right sides of the rear wheel WR.

Referring to FIG. 2, a rear wall of the cylinder head 41 is provided with an intake port 50. An intake system 51 connected to the rear wall of the cylinder head 41 in a manner continued to the intake port 50 includes a throttle body 53, a connecting tube 54, and an air cleaner 55. The throttle body 53 is connected at its downstream end to the rear wall of the cylinder head 41 via an insulator 52 in such a manner so as to communicate with the intake port 50. A downstream end of the connecting tube 54 is connected to an upstream end of the throttle body 53, and an upstream end of the connecting tube 54 is connected to the air cleaner 55.

The throttle body 53 is arranged to tilt upwardly and rearwardly in such a manner that a rear portion of the throttle body 53 is located above the upper cross member 13 of the vehicle body frame F in a side view. The connecting tube 54 connected at the downstream end to the throttle body 53 is arranged to tilt upwardly and rearwardly above the upper cross member 13 and also the shock absorber supporting portion 13a in the side view. In the side view, the air cleaner 55 is arranged below the passenger seat 38 behind the upper cross member 13 having the shock absorber supporting portion 13a and also behind the rear shock absorber unit 30 supported at the upstream end by the shock absorber supporting portion 13a.

The intake system 51 is provided with a first fuel injection valve 56 arranged in front of the upper cross member 13. In the present embodiment, the first fuel injection valve 56, which is always in operation while the internal combustion engine E is in operation, is provided to the throttle body 53 inserted in the intake system 51, and is positioned so as to inject a fuel toward the intake port 50.

The air cleaner 55 includes a clean side case 57 as a passage forming member and a cleaner element 58 attached to the clean side case 57 in a manner covering an opening portion 59 provided to the clean side case 57. The air cleaner 55 is arranged between the pair of left and right seat rails 15 and between the pair of left and right rear frames 17.

The clean side case 57 includes a front case member 60 formed in a dish-like shape opened obliquely upwardly toward the rear and connected at an upper portion thereof to an upstream end of the connecting tube 54 and a rear case member 61 connected to the front case member 60 from an oblique, upper-rear side. The cleaner element 58 is detachably attached to the rear case member 61 in a manner covering, from the rear side, the opening portion 59 provided to the rear case member 61.

An intake passage 62 included in the intake system 51 is formed to reach the intake port 50 from the inside of the clean side case 57 via the connecting tube 54, the throttle body 53 and the insulator 52. The air inside the clean side case 57 flows toward the connecting tube 54 via an air funnel 63 provided at a connection portion of the connecting tube 54 with the front case member 60.

The intake system 51 includes a straddling portion 65 curved in a shape convex upwardly to straddle the shock absorber supporting portion 13a and the upper cross member 13 together from above. The straddling portion 65 includes an upper portion of the clean side case 57 and the connecting tube 54 extending upwardly and rearwardly from the throttle body 53 with the upstream end of the connecting tube 54 connected to the upper portion of the clean side case 57. In addition, the intake passage 62 included in the intake system 51 is formed to extend linearly downwardly and to the front toward the intake port 50 at the downstream side of the straddling portion 65.

Moreover, the upper portion of the clean side case 57 forming at least a part (the part in this embodiment) of the straddling portion 65 by forming an apex part of the straddling portion 65 is provided with a second fuel injection valve 66 for injecting the fuel while the internal combustion engine E is in high speed rotation. The second fuel injection valve 66 is attached with its fuel injection direction directed to the intake port 50 of the cylinder head 41. Note that, the second fuel injection valve 66 is attached to the upper portion of the clean side case 57 behind the apex part of the straddling portion 65.

The clean side case 57 is formed to include an expanded portion 57a at its upper portion. The expanded portion 57a expands upwardly above the shock absorber supporting portion 13a while an upstream end of the connecting tube 54 is connected to the expanded portion 57a. The upstream end of the connecting tube 54 is connected to a front part of the expanded portion 57a, and the second fuel injection valve 66 is attached to the expanded portion 57a on the opposite side from the side to which the upstream end of the connecting tube 54 is connected.

A seat supporting cross member 67 as a second cross member is provided between front portions of the pair of left and right seat rails 15. The seat supporting cross member 67 includes an engaging and supporting portion 67a that engages with and thereby supports a front bottom wall 38a of the passenger seat 38. The expanded portion 57a is arranged below the seat supporting cross member 67 in the side view, and is arranged between the front portions of the pair of left and right seat rails 15 in a plan view. The second fuel injection valve 66 is attached to the expanded portion 57a in a manner covered with the pair of left and right seat rails 15 from the lateral sides and covered with the seat supporting cross member 67 from above.

The cleaner element 58 in the air cleaner 55 is covered, from above, with the passenger seat 38 placed on the pair of left and right seat rails 15, is covered, from the lateral sides, with a pair of left and right side covers 68 supported by the seat rails 15, and is covered, from below and behind, with a rear fender 69 attached to rear portions of the seat rails 15. The second fuel injection valve 66 is attached to the clean side case 57 above the cleaner element 58. In addition, muffler covers 70 covering the mufflers 47 from above are provided continuously from the side covers 68 at the lower sides of the side covers 68.

Next, effects of the present embodiment are explained. The intake system 51 includes the air cleaner 55 arranged behind the upper cross member 13 having the shock absorber supporting portion 13a supporting the upper end of the rear shock absorber unit 30 and connecting the upper ends of the pair of left and right pivot frames 12, and also includes the throttle body 53 inserted between the air cleaner 55 and the intake port 50 of the engine main body EB. The intake system 51 is connected to the cylinder head 41 of the engine main body EB in such a manner so as to have the straddling portion 65 curved in a shape convex upwardly to straddle the upper cross member 13 and also the shock absorber supporting portion 13a together from above. The first fuel injection valve 56 arranged in front of the upper cross member 13 is provided to the throttle body 53 of the intake system 51 and the intake passage 62 included in the intake system 51 is formed to extend linearly downwardly and to the front toward the intake port 50 at the downstream side of the straddling portion 65. The upper portion of the clean side case 57 forming at least the part of the straddling portion 65 by forming the apex part of the straddling portion 65 is provided with the second fuel injection valve 66 attached with its fuel injection direction directed toward the intake port 50. Thus, in fuel injection from the second fuel injection valve 66, fuel-mixed air is fed to the intake port 50 linearly and downwardly from above. This structure enhances the intake efficiency by reducing an intake pressure loss and allows the second fuel injection valve 66 to be easily arranged behind the upper cross member 13. Moreover, this structure is also capable of promoting atomization of the fuel by use of a distance secured between the second fuel injection valve 66 and the intake port 50.

The second fuel injection valve 66 is attached to the upper portion of the clean side case 57 behind the apex part of the straddling portion 65. In this way, the second fuel injection valve 66 can be easily arranged with its fuel injection direction directed toward the intake port 50, without using a special bracket or the like, but by using the shape of the straddling portion 65 curved to be convex upward.

The straddling portion 65 includes the upper portion of the clean side case 57 forming the part of the air cleaner 55, and the connecting tube 54 extending upwardly and rearwardly from the throttle body 53 with the upstream end of the connecting tube 54 attached to the upper portion of the clean side case 57. In addition, the second fuel injection valve 66 is attached to the clean side case 57. Thus, the intake passage 62 has a large capacity of the clean side case 57 at the upstream side of the curved part of the straddling portion 65. Thus, the intake pressure loss due to the curved structure can be reduced. Moreover, since the second fuel injection valve 66 is attached to the clean side case 57, only an attachment portion for attaching the second fuel injection valve 66 needs to be formed in the clean side case 57. In this way, the second fuel injection valve 66 can be attached with simple processing and structure.

The clean side case 57 is formed such that the upper portion thereof includes the expanded portion 57a expanded upwardly above the shock absorber supporting portion 13a while the upstream end of the connecting tube 54 is connected to the expanded portion 57a. The second fuel injection valve 66 is attached to the expanded portion 57a on the opposite side from the side to which the upstream end of the connecting tube 54 is connected. This structure can enhance the degrees of freedom in positions where the connecting tube 54 and the second fuel injection valve 66 are to be attached to the clean side case 57.

In addition, since the seat supporting cross member 67 is provided between the front portions of the pair of left and right seat rails 15. The expanded portion 57a is arranged below the seat supporting cross member 67 in the side view, and is arranged between the front portions of the pair of left and right seat rails 15 in the plan view. The second fuel injection valve 66 is attached to the expanded portion 57a in a manner covered with the pair of left and right seat rails 15 from the lateral sides and covered with the seat supporting cross member 67 from above. Thus, the seat supporting cross member 67 provided between the front portions of the pair of left and right seat rails 15 exists above the second fuel injection valve 66, and the pair of left and right seat rails 15 exist on the lateral sides of the second fuel injection valve 66. In this way, the second fuel injection valve 66 can be protected by the seat supporting cross member 67 and the seat rails 15.

Furthermore, the air cleaner 55 includes the clean side case 57 and the cleaner element 58 attached to the clean side case 57 in a manner covering the opening portion 59 provided to the clean side case 57. The cleaner element 58 is covered from above with the passenger seat 38 placed on the pair of left and right seat rails 15, is covered from the lateral sides with the pair of side covers 68 supported by the seat rails 15 and is covered from below and behind with the rear fender 69 attached to the rear portions of the seat rails 15. The second fuel injection valve 66 is attached to the clean side case 57 above the cleaner element 58. Thus, the second fuel injection valve 66 is accessible from above only by detaching the passenger seat 38. Thus, it is easy to perform maintenance work on the second fuel injection valve 66.

Although an embodiment of the present invention has been described hereinabove, the present invention should not be limited to the embodiment described above. The present invention can be modified in design in various ways without departing from the invention described in the scope of claims.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims

What is claimed is:

1. A saddle ride vehicle having a vehicle body frame comprising:
    a head pipe supporting a steering handlebar in a steerable manner;
    a pair of left and right main frames extending downwardly and rearwardly from the head pipe;
    a pair of left and right pivot frames extending downwardly from rear ends of the main frames;
    a pair of left and right seat rails extending rearwardly continuously from the rear ends of the main frames or upper ends of the pivot frames; and
    a cross member including a shock absorber supporting portion supporting an upper end of a rear shock absorber unit, the cross member connecting the rear ends of the pair of left and right main frames or the upper ends of the pair of left and right pivot frames together;
    an engine main body of an internal combustion engine is mounted on the vehicle body frame below the main frames in a side view;
    an intake system includes an air cleaner arranged behind the cross member with a throttle body inserted between the air cleaner;
    an intake port of the engine main body being connected to the engine main body in such a manner so as to have a straddling portion curved in a shape convex upwardly to straddle the cross member and also the shock absorber supporting portion together from above; and
    a fuel injection valve arranged in front of the cross member, said fuel injection valve being operatively connected to the intake system;
    wherein an intake passage included in the intake system is formed to extend linearly downwardly and forward toward the intake port at a downstream side of the straddling portion; and
    an upper portion of a passage forming member forming at least a part of the straddling portion by forming an apex part of the straddling portion is provided with a second fuel injection valve attached with its fuel injection direction directed to the intake port;
    wherein said passage forming member is a clean side case constituting a part of the air cleaner, said straddling portion includes an upper portion of the clean side case and a connecting tube extends upwardly and rearwardly from the throttle body with an upstream end of the connecting tube connected to the upper portion of the clean side case and said second fuel injection valve is attached to the clean side case.

2. The saddle ride vehicle according to claim 1, wherein the second fuel injection valve is attached to the upper portion of the passage forming member behind the apex part of the straddling portion.

3. The saddle ride vehicle according to claim 1, wherein the clean side case is formed to include an expanded portion at the upper portion thereof, the expanded portion is expanded upwardly above the shock absorber supporting portion with the upstream end of the connecting tube connected to the expanded portion; and
    the second fuel injection valve is attached to the expanded portion on an opposite side from a side to which the upstream end of the connecting tube is connected.

4. The saddle ride vehicle according to claim 3, wherein a second cross member is provided between front portions of the pair of left and right seat rails; and
    the second fuel injection valve is attached to the expanded portion arranged below the second cross member in the side view, and arranged between the front portions of the pair of left and right seat rails in a plan view with the second fuel injection valve attached in a manner covered with the pair of left and right seat rails from lateral sides and covered with the second cross member from above.

5. The saddle ride vehicle according to claim 1, wherein the air cleaner includes the clean side case and a cleaner element attached to the clean side case in a manner covering an opening portion provided to the clean side case;
    the cleaner element is covered from above with a passenger seat placed on the pair of left and right seat rails;
    the cleaner element is covered from lateral sides with a pair of left and right side covers supported by the seat rails;
    the cleaner element is covered from below and behind with a rear fender attached to rear portions of the seat rails; and
    the second fuel injection valve is attached to the clean side case above the cleaner element.

6. A saddle ride vehicle having a vehicle body frame comprising:
    a cross member including a shock absorber supporting portion supporting an upper end of a rear shock absorber unit, the cross member connecting rear ends of a pair of left and right main frames or the upper ends of a pair of left and right pivot frames together;
    an engine main body of an internal combustion engine, said engine main body being mounted on the vehicle body frame;
    an intake system includes an air cleaner arranged behind the cross member with a throttle body inserted between the air cleaner;
    an intake port of the engine main body being connected to the engine main body in such a manner so as to have a straddling portion curved in a shape convex upwardly to straddle the cross member and also the shock absorber supporting portion together from above; and
    a fuel injection valve arranged in front of the cross member, said fuel injection valve being operatively connected to the intake system;
    wherein an intake passage included in the intake system is formed to extend linearly downwardly and forward toward the intake port at a downstream side of the straddling portion; and
    an upper portion of a passage forming member forming at least a part of the straddling portion by forming an apex part of the straddling portion is provided with a second fuel injection valve attached with its fuel injection direction directed to the intake port;
    wherein said passage forming member is a clean side case constituting a part of the air cleaner, said straddling portion includes an upper portion of the clean side case and a connecting tube extends upwardly and rearwardly from the throttle body with an upstream end of the connecting tube connected to the upper portion of the clean side case and said second fuel injection valve is attached to the clean side case.

7. The saddle ride vehicle according to claim 6, wherein the second fuel injection valve is attached to the upper portion of the passage forming member behind the apex part of the straddling portion.

8. The saddle ride vehicle according to claim 6, wherein the clean side case is formed to include an expanded portion at the upper portion thereof, the expanded portion is expanded upwardly above the shock absorber supporting portion with the upstream end of the connecting tube connected to the expanded portion; and the second fuel injection valve is attached to the expanded portion on an opposite side from a side to which the upstream end of the connecting tube is connected.

9. The saddle ride vehicle according to claim 8, wherein a second cross member is provided between front portions of a pair of left and right seat rails; and the second fuel injection valve is attached to the expanded portion arranged below the second cross member in the side view, and arranged between the front portions of the pair of left and right seat rails in a plan view with the second fuel injection valve attached in a manner covered with the pair of left and right seat rails from lateral sides and covered with the second cross member from above.

10. The saddle ride vehicle according to claim 6, wherein the air cleaner includes the clean side case and a cleaner element attached to the clean side case in a manner covering an opening portion provided to the clean side case;

the cleaner element is covered from above with a passenger seat placed on the pair of left and right seat rails;

the cleaner element is covered from lateral sides with a pair of left and right side covers supported by the seat rails;

the cleaner element is covered from below and behind with a rear fender attached to rear portions of the seat rails; and the second fuel injection valve is attached to the clean side case above the cleaner element.

* * * * *